(12) United States Patent
Poloso

(10) Patent No.: US 7,592,395 B2
(45) Date of Patent: Sep. 22, 2009

(54) MULTIMODAL POLYETHYLENE FOR USE IN SINGLE PIECE BEVERAGE BOTTLE CAPS AND CLOSURES

(75) Inventor: Anthony Poloso, Prairieville, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 472 days.

(21) Appl. No.: 11/497,497

(22) Filed: Aug. 1, 2006

(65) Prior Publication Data

US 2008/0033111 A1 Feb. 7, 2008

(51) Int. Cl.
*C08L 23/00* (2006.01)
*C08L 23/04* (2006.01)
*C08L 23/08* (2006.01)

(52) U.S. Cl. ........................ 525/191; 525/240

(58) Field of Classification Search ................. 525/240, 525/191
See application file for complete search history.

(56) References Cited

U.S. PATENT DOCUMENTS

| | | | |
|---|---|---|---|
| 6,316,546 B1 | 11/2001 | Ong et al. | |
| 6,410,474 B1 | 6/2002 | Nowlin et al. | |
| 6,420,298 B1 | 7/2002 | Mink et al. | |
| 6,458,911 B1 | 10/2002 | Ong et al. | |
| 6,541,584 B1 | 4/2003 | Resconi | |
| 6,569,963 B2 | 5/2003 | Nowlin et al. | |
| 6,924,351 B2 | 8/2005 | Gralinski et al. | |
| 6,969,741 B2 | 11/2005 | Lustiger et al. | |
| 7,022,770 B2 | 4/2006 | Lustiger et al. | |
| 7,285,617 B2 * | 10/2007 | Poloso et al. | 528/480 |
| 7,307,133 B2 * | 12/2007 | McDaniel et al. | 526/348.2 |
| 2008/0287608 A1 * | 11/2008 | Nord-Varhaug et al. | 525/240 |

FOREIGN PATENT DOCUMENTS

| | | |
|---|---|---|
| EP | 778 289 B1 | 6/1997 |
| EP | 1 268 576 | 1/2003 |
| EP | 1 357 151 | 10/2003 |
| WO | WO 03/047839 | 6/2003 |
| WO | WO 2004/005357 | 1/2004 |
| WO | WO 2005/014680 | 2/2005 |
| WO | WO 2006/067179 | 6/2006 |

* cited by examiner

*Primary Examiner*—Nathan M Nutter

(57) ABSTRACT

The present invention relates to single piece beverage bottle caps containing and/or made from polyethylene polymers, polymer blends, and/or resins. These polymers/blends/resins have a multimodal molecular weight distribution, sufficient physico-chemical characteristics, and superior environmental stress cracking resistance, so as to be ideally suited for articles and applications such as caps and closures.

19 Claims, No Drawings

MULTIMODAL POLYETHYLENE FOR USE IN SINGLE PIECE BEVERAGE BOTTLE CAPS AND CLOSURES

FIELD OF THE INVENTION

The present invention relates to multimodal polyethylene-based resins and blends useful for fabrication into single piece beverage bottle caps and closures.

BACKGROUND OF THE INVENTION

Beverage bottle containers currently have two piece caps where one of the pieces, typically the outer piece or hard cap, predominantly contains polypropylene, and the other piece, typically the inner piece or liner, predominantly contains an ethylene-vinyl acetate (EVA) copolymer. Polypropylene is relatively inexpensive, tough, dense, and moldable, but can be challenging to process without a relatively high degree of processing additives. Without the relatively high degree of processing additives, the polypropylene cannot typically be processed effectively into beverage bottle caps. These processing additives, in a single piece polypropylene beverage bottle cap, can and often do leach out into the beverage contained in the beverage bottle, thus contaminating the beverage and causing undesirable organoleptic properties.

Thus, one reason that two piece beverage bottle caps have been used is to gain the sealability and positive organoleptic properties of the low density EVA liner, while simultaneously retaining the other physical properties of polypropylene without exposing the beverage to the polypropylene processing additives. However, two piece beverage bottle caps can be expensive and difficult to process, particularly because of the relatively high cost of the EVA copolymer resin and the complications of a multi-step fabrication process.

The present invention seeks to solve these problems by utilizing unique multimodal polyethylene polymers and/or resins that advantageously need lower levels of leachable additives to attain processing efficiency and yet simultaneously exhibit both relative strength and density sufficient for the physical demands of the application. As a result, single piece beverage bottle caps can be made from these unique polymers/resins.

SUMMARY OF THE INVENTION

One aspect of the present invention relates to a single piece acidic beverage bottle cap made from a polymer resin comprising:
  a first polyethylene polymer having a multimodal molecular weight distribution such that a ratio of weight average molecular weight ($M_w$) of the polymer to number average molecular weight ($M_n$) of the polymer is at least about 12, and
  optionally a second polyethylene polymer,
  such that the polymer resin has:
    a density from about 0.941 g/cm$^3$ to about 0.965 g/cm$^3$;
    a melt index from about 0.2 dg/min to about 5.6 dg/min;
    a multimodal molecular weight distribution in which the ratio of weight average molecular weight ($M_w$) of the resin to number average molecular weight ($M_n$) of the resin is at least about 12; and
    a 10% environmental stress cracking resistance of at least about 200 hours.

In one embodiment, the single piece beverage bottle cap is formed by subjecting the polymer resin to one or more of compression molding, injection molding, and roto-molding.

In one embodiment, the first polyethylene polymer has a melt index from about 0.2 dg/min to about 5.6 dg/min, alternately from about 0.3 dg/min to about 3.0 dg/min, alternately from about 0.4 dg/min to about 1.8 dg/min.

In one embodiment, the first polyethylene polymer has a $M_w/M_n$ ratio of at least about 14, alternately at least about 16.

In one embodiment, the first polyethylene polymer has a bimodal molecular weight distribution, was synthesized using a Ziegler-Natta catalyzed, tandem, stirred slurry reactor system, or both.

In one embodiment, the first polyethylene polymer has a density from about 0.941 g/cm$^3$ to about 0.965 g/cm$^3$, alternately from about 0.950 g/cm$^3$ to about 0.958 g/cm$^3$, alternately no more than about 0.958 g/cm$^3$.

In one embodiment, the first polyethylene polymer has an environmental stress cracking resistance (bent strip, 100% Igepal®) of at least about 500 hours and/or an environmental stress cracking resistance (bent strip, 10% Igepal®) of at least about 200 hours.

In one embodiment, the polyethylene resin has a melt index from about 0.3 dg/min to about 3.0 dg/min, alternately from about 0.4 dg/min to about 1.8 dg/min.

In one embodiment, the polyethylene resin has a $M_w/M_n$ ratio of at least about 14, alternately at least about 16.

In one embodiment, the polyethylene resin has a bimodal molecular weight distribution, was synthesized using a Ziegler-Natta catalyzed, tandem, stirred slurry reactor system, or both.

In one embodiment, the polyethylene resin has a density from about 0.950 g/cm$^3$ to about 0.958 g/cm$^3$, alternately no more than about 0.958 g/cm$^3$.

In one embodiment, the polyethylene resin has an environmental stress cracking resistance (bent strip, 100% Igepal®) of at least about 500 hours and/or an environmental stress cracking resistance (bent strip, 10% Igepal®) of at least about 200 hours.

DETAILED DESCRIPTION OF THE PREFERRED EMBODIMENTS

One aspect of the invention relates to a single piece acidic beverage bottle cap made from a polymer resin comprising a first polyethylene polymer having a multimodal molecular weight distribution such that a ratio of weight average molecular weight ($M_w$) of the polymer to number average molecular weight ($M_n$) of the polymer is at least about 12 and optionally a second polyethylene polymer, such that the polymer resin has a density from about 0.941 g/cm$^3$ to about 0.965 g/cm$^3$, a melt index from about 0.2 dg/min to about 5.6 dg/min, a multimodal molecular weight distribution in which the ratio of weight average molecular weight ($M_w$) of the resin to number average molecular weight ($M_n$) of the resin is at least about 12, and a 10% environmental stress cracking resistance of at least about 200 hours.

As used herein, the term "polyethylene polymer" should be understood to include homopolymers and copolymers wherein at least about 80% by weight, preferably at least about 85% by weight, more preferably at least about 90% by weight, for example at least about 95% by weight, at least about 98% by weight, at least about 99% by weight, at least about 99.5% by weight, at least about 99.9% by weight, or about 100% by weight, as synthesized, of the monomer repeat units are based on an ethylene repeat unit structure, i.e., —(CH$_2$—CH$_2$)—. In embodiments where one or more co-monomers are included in the polyethylene polymer(s), as synthesized, the one or more co-monomers can be collectively present in an amount of not more than about 20% by weight, preferably not more than about 15% by weight, more preferably not more than about 10% by weight, for example not more than about 5% by weight, not more than about 2% by weight, not more than about 1% by weight, not more than about 0.5% by weight, or not more than about 0.1% by weight. The one or more co-monomers, when present, can preferably include, but are not limited to, $C_3$-$C_{10}$ alpha-olefins (e.g., propylene, 1-butene, 1-hexene, 1-octene, and 1-decene), more preferably $C_4$-$C_6$ alpha-olefins such as 1-butene and/or 1-hexene. In a preferred embodiment, the one or more co-monomers, when present, can be substantially free from dienes and polyunsaturated compounds.

As used herein, the term "multimodal", as pertaining to molecular weight distributions, should be understood to mean a distribution having two or more overlaid molecular weight peaks or distributions. Thus, as used herein, "multimodal" means anything other than "monomodal", which is having only one molecular weight peak or distribution, and includes "bimodal" (two overlaid peaks/distributions), "trimodal" (three overlaid peaks/distributions), etc. Referring specifically to bimodal distributions, the two overlaid peaks/distributions may be characterizable, for example, using gel permeation chromatography (GPC; also called size exclusion chromatography, or SEC) in an appropriate carrier/diluent. The two overlaid molecular weight distributions may, in some embodiments, exhibit two distinct peaks resolvable by GPC (e.g., which typically yields a plot of retention time on the x-axis vs. an arbitrary detection counting amplitude on the y-axis; in cases where a refractive index, or RI, detector is used, the y-axis could be change in refractive index, or $\Delta$RI). However, the two overlaid molecular weight distributions may, in other embodiments, exhibit a single distinct peak and an inflection point resolvable by GPC. This latter situation can typically appear as a monomodal distribution with a "shoulder", but the "shoulder" actually represents a second, unresolved peak/distribution that is partially hidden by the overlaid, resolvable peak/distribution. In such situations, deconvolution of the shoulder-containing distribution can be accomplished using the appropriate software packages (which should be known, and are available commercially, to those skilled in the art) to separately resolve the two overlaid peaks/distributions. As referenced herein, typically a GPC chromatogram has only as many "modes" as the sum of the peaks and inflection points. Multimodal distributions can be resolved/deconvoluted similarly to bimodal distributions, as described herein.

As referred to herein, the term "processability" should be understood to be relatively inversely proportional to melt index and/or molecular weight. Further, regarding processability, a single piece beverage bottle cap article according to the invention can typically contain a relatively small amount of a slip agent (e.g., not more than about 1 wt %, preferably not more than about 0.8 wt %, for example not more than about 0.6 wt % or not more than about 0.5 wt %, and typically at least about 0.005 wt %, at least about 0.01 wt %, at least about 0.02 wt %, at least about 0.05 wt %, or at least about 0.1 wt %; a non-limiting example of a slip agent is Erusamide®, commercially available from Croda) and a relatively small amount of an antioxidant/thermal stabilizing agent (e.g., not more than about 5000 wppm, preferably not more than about 3000 wppm, not more than about 2000 wppm, not more than about 1000 wppm, not more than about 800 wppm, not more than about 600 wppm, or not more than about 500 wppm, and typically at least about 10 wppm, at least about 25 wppm, at least about 40 wppm, at least about 50 wppm, at least about 65 wppm, at least about 75 wppm, at least about 90 wppm, or at least about 100 wppm; a non-limiting example of an antioxidant is Irganox® and/or Irgafos®, commercially available from Ciba), but can, in some embodiments, otherwise be substantially free from additives, particularly those additives which can have a propensity to leach out into the beverage bottle, causing undesirable organoleptic properties in the beverage at best and causing potential consumer toxicity at worst.

As referred to herein; the phrase "melt indices" should be understood to include, but not be limited to, low load melt index (LLMI, $MI_{2.16}$, or $MI_2$; conducted according to ASTM D-1238) and/or high load melt (HLMI, $MI_{21.6}$, or $MI_{22}$; conducted according to ASTM D-1238).

As referred to herein, the phrase "molecular weight distribution" should be understood to refer to one or more of monomodality, bimodality, and polymodality, as well as including, but not being limited to, reference to one or more of $M_n$, $M_w$, $M_z$, peak molecular weight ($M_p$), $M_w/M_n$, $M_z/M_w$, and the like, with respect to each modality.

As referred to herein, the phrase "organoleptic properties" (see also "processability" herein) should be understood to advantageously refer to a level (preferably a relatively low level) of leachability/toxicity/reactability of additives (if present in the article, e.g., single piece bottle cap) with respect to a frangible composition contained in an article (e.g., a beverage in the bottle). Additionally, the organoleptic properties of the article (bottle cap) should preferably be such that the article fulfills FDA approval requirements for food contact (e.g., as set forth in 21 C.F.R. §§ 177.1520(c)(3.1) and (3.2a).

As referred to herein, the density values delineated are those as measured on article, and do not represent the bulk density of any polymer or polymer resin component.

As referred to herein, the term "toughness" should be understood to correspond, in one embodiment, to the property of tensile strength at break (ASTM D-638-89). Additionally or alternately, in a preferred embodiment, "toughness" values should be understood to correspond to the area under stress-strain curve on tensile test (ASTM D-638-89 and/or ASTM D-638-95).

As referred to herein, the term "stiffness" should be understood to correlate with flexural modulus (ASTM D-790, Method 1, Procedure A, tangent calculation) and/or with tensile modulus (ASTM D-638-89). Additionally or alternately, the term "stiffness" can correlate in a relatively inversely proportional way with % elongation at yield (ASTM D-638-89) and/or with % elongation at break (ASTM D-638-95).

As used herein, the impact strength values cited herein represent the results of a tensile impact test (ASTM D-1822).

As referred to herein, the term "sealability" should be understood to be article-specific and to refer to the capability of a beverage bottle cap in being capable of sufficiently sealing with a beverage bottle. Although sealability of a beverage bottle can depend on various measurable characteristics, one indicator of sealability includes density. That is, lower density polymers tend to be more sealable in caps to bottles than higher density polymers.

As referred to herein, the term "environmental stress cracking resistance", or ESCR, should be understood to refer to the results (e.g., $F_{50}$ values) from bent strips tested according to ASTM D-1698 (Condition B) with 100% Igepal® and/or with 10% Igepal®. As used herein, the phrase "100% environmental stress cracking resistance" should be understood to refer to the former conditions, while the phrase "10% environmental stress cracking resistance" should be understood to refer to the latter conditions.

In one embodiment, the first polyethylene polymer can have a melt index ($MI_2$) from about 0.2 dg/min to about 5.6 dg/min, preferably from about 0.2 dg/min to about 5.0 dg/min, for example from about 0.3 dg/min to about 5.0 dg/min, from about 0.3 dg/min to about 4.0 dg/min, from about 0.3 dg/min to about 3.0 dg/min, from about 0.3 dg/min to about 2.0 dg/min, from about 0.3 dg/min to about 1.8 dg/min, from about 0.3 dg/min to about 1.5 dg/min, from about 0.3 dg/min to about 1.0 dg/min, from about 0.2 dg/min to about 2.5 dg/min, from about 0.2 dg/min to about 2.0 dg/min, from about 0.2 dg/min to about 1.8 dg/min, from about 0.2 dg/min to about 1.5 dg/min, from about 0.2 dg/min to about 1.0 dg/min, from about 0.4 dg/min to about 3.5 dg/min, from about 0.4 dg/min to about 2.5 dg/min, from about 0.4 dg/min to about 2.0 dg/min, from about 0.4 dg/min to about 1.8 dg/min, or from about 0.4 dg/min to about 1.5 dg/min.

In one embodiment, the first polyethylene polymer can have an overall $M_n$ from about 3,000 g/mol to about 35,000 g/mol, for example from about 3,500 g/mol to about 30,000 g/mol, from about 4,000 g/mol to about 25,000 g/mol, from about 4,500 g/mol to about 20,000 g/mol, from about 5,000 g/mol to about 15,000 g/mol, from about 3,000 g/mol to about 20,000 g/mol, from about 8,000 g/mol to about 35,000 g/mol, or from about 10,000 g/mol to about 30,000 g/mol.

In one embodiment, the first polyethylene polymer can have an overall $M_w$ from about 40,000 g/mol to about 400,000 g/mol, for example from about 45,000 g/mol to about 300,000 g/mol, from about 50,000 g/mol to about 250,000 g/mol, from about 55,000 g/mol to about 200,000 g/mol, from about 60,000 g/mol to about 175,000 g/mol, from about 45,000 g/mol to about 250,000 g/mol, from about 75,000 g/mol to about 350,000 g/mol, or from about 80,000 g/mol to about 150,000 g/mol.

In one embodiment, the first polyethylene polymer can have an overall z-average molecular weight ($M_z$) from about 170,000 g/mol to about 4,000,000 g/mol, for example from about 225,000 g/mol to about 3,000,000 g/mol, from about 300,000 g/mol to about 2,500,000 g/mol, from about 350,000 g/mol to about 2,000,000 g/mol, from about 400,000 g/mol to about 1,800,000 g/mol, from about 250,000 g/mol to about 1,500,000 g/mol, from about 425,000 g/mol to about 3,500,000 g/mol, or from about 410,000 g/mol to about 1,400,000 g/mol.

In one embodiment, the first polyethylene polymer can have an overall $M_w/M_n$ ratio of at least about 13, at least about 14, at least about 15, or at least about 16.

In one embodiment, the first polyethylene polymer can have an overall $M_w/M_n$ ratio of less than about 35, less than about 30, less than about 25, less than about 22, or less than about 20.

In one embodiment, the first polyethylene polymer can have an overall $M_z/M_w$ ratio of at least about 3.5, less than about 16, from about 4 to about 12, or from about 4.5 to about 10.5.

In a preferred embodiment, the first polyethylene polymer can have a bimodal molecular weight distribution.

In one embodiment, the first polyethylene polymer can have a density from about 0.941 g/cm³ to about 0.965 g/cm³, preferably from about 0.945 g/cm³ to about 0.960 g/cm³, for example from about 0.948 g/cm³ to about 0.959 g/cm³, from about 0.950 g/cm³ to about 0.958 g/cm³, from about 0.952 g/cm³ to about 0.958 g/cm³, or from about 0.954 g/cm³ to about 0.958 g/cm³. In some embodiments, it may be desirable for the first polyethylene polymer density to be no more than 0.960 g/cm³, preferably no more than 0.959 g/cm³, or in some cases no more than 0.958 g/cm³, particularly in that polymer densities above these values can, in some embodiments, result in undesirably high stiffness, undesirably low processability, or the like, or a combination thereof.

In one embodiment, the first polyethylene polymer can have an impact strength of at least about 10 J/cm², preferably at least about 15 J/cm², for example at least about 17 J/cm², at least about 19 J/cm², at least about 20 J/cm², at least about 22 J/cm², at least about 24 J/cm², at least about 25 J/cm², at least about 26 J/cm², at least about 28 J/cm², or at least about 30 J/cm².

In one embodiment, the first polyethylene polymer can advantageously have an environmental stress cracking resistance (bent strip, 100% Igepal®) of at least about 100 hours, preferably at least about 200 hours, for example at least about 250 hours, at least about 300 hours, at least about 400 hours, at least about 500 hours, at least about 600 hours, at least about 700 hours, at least about 750 hours, at least about 800 hours, at least about 900 hours, or at least about 1000 hours.

In one embodiment, the first polyethylene polymer can advantageously have an environmental stress cracking resistance (bent strip, 10% Igepal®) of at least about 75 hours, preferably at least about 100 hours, for example at least about 125 hours, at least about 150 hours, at least about 175 hours, at least about 200 hours, at least about 210 hours, at least about 220 hours, at least about 230 hours, at least about 240 hours, or at least about 250 hours.

In one embodiment, where the polymer resin comprises no optional second polyethylene polymer, the first polyethylene polymer can advantageously exhibit one or more of the following characteristics:

(a) be an HDPE polymer;

(b) have a density from about 0.950 g/cm³ to about 0.958 g/cm³, from about 0.952 g/cm³ to about 0.958 g/cm³, from about 0.952 g/cm³ to about 0.957 g/cm³, from about 0.953 g/cm³ to about 0.958 g/cm³, from about 0.953 g/cm³ to about 0.957 g/cm³, from about 0.954 g/cm³ to about 0.958 g/cm³, from about 0.954 g/cm³ to about 0.957 g/cm³, from about 0.955 g/cm³ to about 0.958 g/cm³, from about 0.955 g/cm³ to about 0.957 g/cm³, or of about 0.956 g/cm³;

(c) have a melt index ($MI_2$) from about 0.4 dg/min to about 3.5 dg/min, from about 0.5 dg/min to about 3.0 dg/min, from about 0.7 dg/min to about 2.5 dg/min, from about 0.9 dg/min to about 2.2 dg/min, from about 1.0 dg/min to about 2.0 dg/min, from about 1.2 dg/min to about 1.8 dg/min, from about 1.3 dg/min to about 1.7 dg/min, from about 1.4 dg/min to about 1.6 dg/min, or of about 1.5 dg/min;

(d) have an $M_n$ from about 3,000 g/mol to about 35,000 g/mol, from about 3,500 g/mol to about 30,000 g/mol, from about 4,000 g/mol to about 25,000 g/mol, from about 4,500 g/mol to about 20,000 g/mol, from about 5,000 g/mol to about 15,000 g/mol, from about 3,000 g/mol to about 20,000 g/mol, from about 8,000 g/mol to about 35,000 g/mol, or from about 10,000 g/mol to about 30,000 g/mol;

(e) have an $M_w$ from about 40,000 g/mol to about 400,000 g/mol, for example from about 45,000 g/mol to about 300,000 g/mol, from about 50,000 g/mol to about 250,000 g/mol, from about 55,000 g/mol to about 200,000 g/mol, from about 60,000 g/mol to about 175,000 g/mol, from about 45,000 g/mol to about 250,000 g/mol, from about 75,000 g/mol to about 350,000 g/mol, or from about 80,000 g/mol to about 150,000 g/mol;

(f) have an $M_w/M_n$ ratio of at least about 14, at least about 15, at least about 16, alternately less than about 35, less than about 30, less than about 25, less than about 22, less than about 20, or alternately from about 14 to about 25, from about 15 to about 22, from about 16 to about 21, or from about 16 to about 25;

(g) have an environmental stress cracking resistance (bent strip, 100% Igepal®) of at least about 200 hours, for example at least about 250 hours, at least about 300 hours, at least about 400 hours, at least about 500 hours, at least about 600 hours, at least about 700 hours, at least about 750 hours, at least about 800 hours, at least about 900 hours, or at least about 1000 hours; and (h) have an environmental stress cracking resistance (bent strip, 10% Igepal®) of at least about 75 hours, preferably at least about 100 hours, for example at least about 125 hours, at least about 150 hours, at least about 175 hours, at least about 200 hours, at least about 210 hours, at least about 220 hours, at least about 230 hours, at least about 240 hours, or at least about 250 hours.

In a preferred embodiment, where the polymer resin comprises a blend of two polymers, the first polyethylene polymer is at least a majority component by weight (i.e., comprises at least 50 wt % of the polymer resin), and the second polyethylene polymer is a minority component by weight (i.e., comprises less than 50 wt % of the polymer resin). In various embodiments, the proportion of the various polyethylene polymer components of the resin can be varied to tailor certain characteristics of the fabricated article. Non-limiting examples of characteristics desirable to tailor, particularly in the case of single piece beverage bottle caps according to the invention, include, but are not limited to, processability, melt indices, molecular weight distribution, density, toughness, stiffness, impact strength, organoleptic properties, sealability, environmental stress cracking resistance, and the like, and any combination thereof.

In one embodiment, where the polymer resin comprises a blend of two polymers, the second polyethylene polymer can have a melt index ($MI_2$) from about 0.2 dg/min to about 5.6 dg/min, preferably from about 0.3 dg/min to about 5.0 dg/min, for example from about 0.4 dg/min to about 5.0 dg/min, from about 0.4 dg/min to about 4.0 dg/min, from about 0.4 dg/min to about 3.0 dg/min, from about 0.7 dg/min to about 4.0 dg/min, from about 0.7 dg/min to about 3.5 dg/min, from about 0.7 dg/min to about 3.0 dg/min, from about 0.7 dg/min to about 2.5 dg/min, from about 1.0 dg/min to about 3.5 dg/min, from about 1.0 dg/min to about 3.0 dg/min, from about 1.0 dg/min to about 2.5 dg/min, from about 1.4 dg/min to about 4.0 dg/min, from about 1.4 dg/min to about 3.5 dg/min, from about 1.4 dg/min to about 3.0 dg/min, from about 1.4 dg/min to about 2.5 dg/min, from about 1.6 dg/min to about 5.0 dg/min, from about 1.6 dg/min to about 4.0 dg/min, from about 1.6 dg/min to about 3.5 dg/min, from about 1.6 dg/min to about 3.0 dg/min, from about 2.0 dg/min to about 4.0 dg/min, from about 1.8 dg/min to about 3.0 dg/min, or from about 1.8 dg/min to about 2.5 dg/min.

In one embodiment, where the polymer resin comprises a blend of two polymers, the second polyethylene polymer can have an $M_n$ from about 3,000 g/mol to about 35,000 g/mol, from about 3,500 g/mol to about 30,000 g/mol, from about 4,000 g/mol to about 25,000 g/mol, from about 4,500 g/mol to about 20,000 g/mol, from about 5,000 g/mol to about 15,000 g/mol, from about 3,000 g/mol to about 20,000 g/mol, from about 8,000 g/mol to about 35,000 g/mol, or from about 10,000 g/mol to about 30,000 g/mol.

In one embodiment, where the polymer resin comprises a blend of two polymers, the second polyethylene polymer can have an $M_w$ from about 40,000 g/mol to about 400,000 g/mol, for example from about 45,000 g/mol to about 300,000 g/mol, from about 50,000 g/mol to about 250,000 g/mol, from about 55,000 g/mol to about 200,000 g/mol, from about 60,000 g/mol to about 175,000 g/mol, from about 45,000 g/mol to about 250,000 g/mol, from about 75,000 g/mol to about 350,000 g/mol, or from about 80,000 g/mol to about 150,000 g/mol.

In one embodiment, where the polymer resin comprises a blend of two polymers, the second polyethylene polymer can have an $M_z$ from about 170,000 g/mol to about 4,000,000 g/mol, for example from about 225,000 g/mol to about 3,000,000 g/mol, from about 300,000 g/mol to about 2,500,000 g/mol, from about 350,000 g/mol to about 2,000,000 g/mol, from about 400,000 g/mol to about 1,800,000 g/mol, from about 250,000 g/mol to about 1,500,000 g/mol, from about 425,000 g/mol to about 3,500,000 g/mol, or from about 410,000 g/mol to about 1,400,000 g/mol.

In one embodiment, where the polymer resin comprises a blend of two polymers, the second polyethylene polymer can have an $M_w/M_n$ ratio of at least about 13, at least about 14, at least about 15, or at least about 16.

In one embodiment, where the polymer resin comprises a blend of two polymers, the second polyethylene polymer can have an $M_w/M_n$ ratio of less than about 35, less than about 30, less than about 25, less than about 22, or less than about 20.

In one embodiment, where the polymer resin comprises a blend of two polymers, the second polyethylene polymer can have an $M_z/M_w$ ratio of at least about 3.5, less than about 16, from about 4 to about 12, or from about 4.5 to about 10.5.

In one embodiment, where the polymer resin comprises a blend of two polymers, the second polyethylene polymer can have a multimodal molecular weight distribution, for example a bimodal molecular weight distribution.

In one embodiment, where the polymer resin comprises a blend of two polymers, the second polyethylene polymer can be an HDPE polymer and can have a density from about 0.945 $g/cm^3$ to about 0.970 $g/cm^3$, preferably from about 0.945 $g/cm^3$ to about 0.965 $g/cm^3$, for example from about 0.948 $g/cm^3$ to about 0.965 $g/cm^3$, from about 0.950 $g/cm^3$ to about 0.965 $g/cm^3$, from about 0.952 $g/cm^3$ to about 0.965 $g/cm^3$, from about 0.954 $g/cm^3$ to about 0.965 $g/cm^3$, or from about 0.956 $g/cm^3$ to about 0.965 $g/cm^3$. In some embodiments, it may be desirable for the second polyethylene polymer density to be greater than the first polyethylene polymer density, particularly when the first polyethylene polymer density is not more than about 0.960 $g/cm^3$, not more than about 0.958 $g/cm^3$, not more than about 0.957 $g/cm^3$, not more than about 0.956 $g/cm^3$, not more than about 0.955 $g/cm^3$, or not more than about 0.954 $g/cm^3$.

In an alternate embodiment, where the polymer resin comprises a blend of two polymers, the second polyethylene polymer can have a density from about 0.910 $g/cm^3$ to about 0.940 $g/cm^3$, for example from about 0.915 $g/cm^3$ to about 0.935 $g/cm^3$, from about 0.915 $g/cm^3$ to about 0.925 $g/cm^3$, from about 0.910 $g/cm^3$ to about 0.935 $g/cm^3$, from about 0.910 $g/cm^3$ to about 0.930 $g/cm^3$, from about 0.920 $g/cm^3$ to about 0.940 $g/cm^3$, from about 0.920 $g/cm^3$ to about 0.930 $g/cm^3$, or from about 0.930 $g/cm^3$ to about 0.940 $g/cm^3$. In such embodiments, the second polyethylene polymer can be an LDPE polymer or an LLDPE polymer. In some embodiments, it may be desirable for the second polyethylene polymer density to be less than the first polyethylene polymer density, particularly when the first polyethylene polymer density is more than about 0.958 $g/cm^3$, more than about 0.959 $g/cm^3$, more than about 0.960 $g/cm^3$, more than about 0.961 $g/cm^3$, more than about 0.962 $g/cm^3$, more than about 0.963 $g/cm^3$, or more than about 0.964 $g/cm^3$.

In one embodiment, where the polymer resin comprises a blend of two polymers, the second polyethylene polymer can have an impact strength of at least about 10 $J/cm^2$, preferably at least about 15 $J/cm^2$, for example at least about 17 $J/cm^2$, at least about 19 J/cm², at least about 20 J/cm², at least about 22 J/cm², at least about 24 J/cm², at least about 25 J/cm², at least about 26 J/cm², at least about 28 J/cm², or at least about 30 J/cm².

In one embodiment, where the polymer resin comprises a blend of two polymers, the second polyethylene polymer can have an environmental stress cracking resistance (bent strip, 100% Igepal®) of at least about 100 hours, preferably at least about 200 hours, for example at least about 250 hours, at least about 300 hours, at least about 400 hours, at least about 500 hours, at least about 600 hours, at least about 700 hours, at least about 750 hours, at least about 800 hours, at least about 900 hours, or at least about 1000 hours.

In one embodiment, where the polymer resin comprises a blend of two polymers, the second polyethylene polymer can have an environmental stress cracking resistance (bent strip, 10% Igepal®) of at least about 75 hours, preferably at least about 100 hours, for example at least about 125 hours, at least about 150 hours, at least about 175 hours, at least about 200 hours, at least about 210 hours, at least about 220 hours, at least about 230 hours, at least about 240 hours, or at least about 250 hours.

In one embodiment, whether the polymer resin comprises a blend of two (or more) polymers or a single polymer component, the resin can have an $M_n$ from about 3,000 g/mol to about 35,000 g/mol, from about 3,500 g/mol to about 30,000 g/mol, from about 4,000 g/mol to about 25,000 g/mol, from about 4,500 g/mol to about 20,000 g/mol, from about 5,000 g/mol to about 15,000 g/mol, from about 3,000 g/mol to about 20,000 g/mol, from about 8,000 g/mol to about 35,000 g/mol, or from about 10,000 g/mol to about 30,000 g/mol.

In one embodiment, whether the polymer resin comprises a blend of two (or more) polymers or a single polymer component, the resin can have an $M_w$ from about 40,000 g/mol to about 400,000 g/mol, for example from about 45,000 g/mol to about 300,000 g/mol, from about 50,000 g/mol to about 250,000 g/mol, from about 55,000 g/mol to about 200,000 g/mol, from about 60,000 g/mol to about 175,000 g/mol, from about 45,000 g/mol to about 250,000 g/mol, from about 75,000 g/mol to about 350,000 g/mol, or from about 80,000 g/mol to about 150,000 g/mol.

In one embodiment, whether the polymer resin comprises a blend of two (or more) polymers or a single polymer component, the resin can have an $M_z$ from about 170,000 g/mol to about 4,000,000 g/mol, for example from about 225,000 g/mol to about 3,000,000 g/mol, from about 300,000 g/mol to about 2,500,000 g/mol, from about 350,000 g/mol to about 2,000,000 g/mol, from about 400,000 g/mol to about 1,800,000 g/mol, from about 250,000 g/mol to about 1,500,000 g/mol, from about 425,000 g/mol to about 3,500,000 g/mol, or from about 410,000 g/mol to about 1,400,000 g/mol.

In one embodiment, whether the polymer resin comprises a blend of two (or more) polymers or a single polymer component, the resin can advantageously have an $M_w/M_n$ ratio of at least about 12, at least about 13, at least about 14, at least about 15, or at least about 16.

In one embodiment, whether the polymer resin comprises a blend of two (or more) polymers or a single polymer component, the resin can have an $M_w/M_n$ ratio of less than about 35, less than about 30, less than about 25, less than about 22, or less than about 20.

In one embodiment, whether the polymer resin comprises a blend of two (or more) polymers or a single polymer component, the resin can have an $M_z/M_w$ ratio of at least about 3.5, less than about 16, from about 4 to about 12, or from about 4.5 to about 10.5.

In one embodiment, the polymer resin can have a density from about 0.940 g/cm³ to about 0.970 g/cm³, preferably from about 0.945 g/cm³ to about 0.965 g/cm³, for example from about 0.948 g/cm³ to about 0.960 g/cm³, from about 0.950 g/cm³ to about 0.959 g/cm³, from about 0.952 g/cm³ to about 0.958 g/cm³, from about 0.954 g/cm³ to about 0.958 g/cm³, or from about 0.955 g/cm³ to about 0.957 g/cm³. In some embodiments, it may be desirable for the polymer resin density to be no more than 0.960 g/cm³, preferably no more than 0.959 g/cm³, or in some cases no more than about 0.958 g/cm³, particularly in that polymer resin densities above these values can, in some embodiments, result in beverage bottle caps having undesirably high stiffness, undesirably low processability, or the like, or a combination thereof.

In one embodiment, whether the polymer resin comprises a blend of two (or more) polymers or a single polymer component, it can be particularly advantageous for the polymer resin to have a melt index ($MI_2$) from about 0.2 dg/min to about 5.0 dg/min, for example from about 0.3 dg/min to about 4.5 dg/min, from about 0.4 dg/min to about 4.0 dg/min, from about 0.5 dg/min to about 3.5 dg/min, from about 0.7 dg/min to about 3.0 dg/min, from about 0.9 dg/min to about 2.5 dg/min, from about 1.0 dg/min to about 2.0 dg/min, from about 1.2 dg/min to about 1.8 dg/min, from about 0.2 dg/min to about 2.0 dg/min, from about 1.2 dg/min to about 4.0 dg/min, from about 0.9 dg/min to about 4.5 dg/min, from about 1.4 dg/min to about 5.0 dg/min, of from about 1.4 dg/min to about 2.5 dg/min.

In one embodiment, the polyethylene resin can have an impact strength of at least about 10 J/cm², preferably at least about 15 J/cm², for example at least about 17 J/cm², at least about 19 J/cm², at least about 20 J/cm², at least about 22 J/cm², at least about 24 J/cm², at least about 25 J/cm², at least about 26 J/cm², at least about 28 J/cm², or at least about 30 J/cm².

In one embodiment, the polyethylene resin can advantageously have an environmental stress cracking resistance (bent strip, 100% Igepal®) of at least about 100 hours, preferably at least about 200 hours, for example at least about 250 hours, at least about 300 hours, at least about 400 hours, at least about 500 hours, at least about 600 hours, at least about 700 hours, at least about 750 hours, at least about 800 hours, at least about 900 hours, or at least about 1000 hours.

In one embodiment, the polyethylene resin can advantageously have an environmental stress cracking resistance (bent strip, 10% Igepal®) of at least about 75 hours, preferably at least about 100 hours, for example at least about 125 hours, at least about 150 hours, at least about 175 hours, at least about 200 hours, at least about 210 hours, at least about 220 hours, at least about 230 hours, at least about 240 hours, or at least about 250 hours.

Polyethylene polymers suitable for use in the polymer resin and single piece beverage bottle cap according to the invention can be made by any suitable process, but can preferably be made using a single and/or a tandem reactor system, as well as by single-site catalyzed and/or multi-site catalyzed processes, e.g., by a metallocene-catalyzed process, by a supported bimetallic-catalyzed process, by an unsupported bimetallic-catalyzed process, by a Ziegler-Natta-catalyzed process, or by a combination thereof.

Non-limiting examples of polyethylene polymerization systems can include, but are not limited to, gas phase polymerization reactor(s), slurry loop(s), stirred slurry(ies), high pressure polymerization reactor(s), or the like, or a combination thereof. When used in tandem, whether alike or different, the polymerization systems can be in series, in parallel, or a combination thereof.

Descriptions of some useful polyethylene polymerization processes can be found, e.g., in the disclosures of International Publication Nos. WO 2004/005357 A1 and WO 2003/047839 A1, which are hereby fully incorporated by reference herein.

Non-limiting examples of metallocene catalysts for polyethylenes can include, but are not limited to, mono-cyclopentadienyl metal compounds, bridged mono-cyclopentadienyl metal compounds, bis-cyclopentadienyl metal compounds, bridged bis-cyclopentadienyl metal compounds, mono-indenyl metal compounds, bridged mono-indenyl metal compounds, bis-indenyl metal compounds, bridged bis-indenyl metal compounds, and the like, and combinations thereof. Non-limiting examples of metallocene catalyst metals can include, but are not limited to, transition metals in Group 4 of the Periodic Table of Elements (e.g., titanium, zirconium, and/or hafnium).

Non-limiting examples of Ziegler-Natta catalysts for polyethylenes can include, but are not limited to, titanium halides (e.g., titanium chlorides such as $TiCl_4$, $TiCl_3$, and the like, and combinations thereof) and the like, optionally in combination with Ziegler-Natta co-catalysts such as aluminum halides (e.g., aluminum chlorides and the like).

Non-limiting examples of bimetallic catalysts for polyethylenes can include, but are not limited to, combinations of metallocene catalysts having two different metals, combinations of Ziegler-Natta catalysts having two different metals, or a combination of one metallocene catalyst and one Ziegler-Natta catalyst having two different metals.

In a preferred embodiment, the polyethylene polymer(s) can be made using a stirred slurry tandem series reactor using a titanium halide Ziegler-Natta catalyst, optionally including a co-catalyst such as an aluminum halide.

Other publications disclosing reactors and/or processes that could be useful in making the polyethylene polymers and/or polymer resins according to the invention can include, but are not necessarily limited to, U.S. Pat. Nos. 6,316,546, 6,410,474, 6,420,298, 6,458,911, 6,569,963, 6,924,351, 6,969,741, and 7,022,770, as well as European Patent No. EP 0 778 289 B1, the entire disclosures of each of which are hereby incorporated by reference.

The polymer resin can be formed into the single piece beverage bottle cap according to the invention by any processing technique known or available to those of skill in the art. Non-limiting examples of such processing techniques include, but are not limited to, blow molding, extrusion, injection molding, compression molding, roto-molding, casting, reduced-pressure molding, and the like, and combinations thereof, preferably including at least one of injection molding, compression molding, and roto-molding.

In one embodiment, the beverage bottle, on which a single piece beverage bottle cap according to the invention is designed to fit, can contain an acidic beverage. As used herein, the term "acidic", as it relates to beverages, should be understood to mean that the beverage has a pH below 7.0, for example from about 1.0 to about 6.9 or from about 1.5 to about 6.8. In one embodiment, the beverage bottle, on which a single piece beverage bottle cap according to the invention is designed to fit, does not solely contain water, regardless of its pH.

Examples of acidic beverages can include, but are not limited to, fruit juices (e.g., apple, orange, grape, cranberry, or the like), sweetened teas, carbonated beverages (e.g., a soda, a carbonated fruit drink, sparkling water, tonic, or the like), milk, and the like.

In other aspects of the invention, the polymer resin useful for single piece beverage bottle caps according to the invention can additionally or alternately be used in other articles (e.g., such as other closures) requiring similar sealability, organoleptic properties, toughness, stiffness, impact strength, density, and/or environmental stress cracking resistance.

It should be appreciated by one of ordinary skill in the art that any embodiments, though listed separately, may additionally or alternately be combined together to form compositions, articles, and/or methods according to the invention, to the extent that such combinations are not expressly mutually exclusive.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A single piece acidic beverage bottle cap made from a polymer resin comprising:
   a first polyethylene polymer having a multimodal molecular weight distribution such that a ratio of weight average molecular weight ($M_w$) of the polymer to number average molecular weight ($M_n$) of the polymer is at least about 12, wherein the first polyethylene polymer has a low load melt index ($MI_2$) from about 0.2 dg/min to about 5.6 dg/min and
   a second polyethylene polymer having a low load melt index ($MI_2$) of from about 0.2 dg/min to about 5.6 dg/min,
   such that the polymer resin has:
      a density from about 0.941 g/cm$^3$ to about 0.965 g/cm$^3$;
      a low load melt index ($MI_2$) from about 0.2 dg/min to about 5.6 dg/min;
      a multimodal molecular weight distribution in which the ratio of weight average molecular weight ($M_w$) of the resin to number average molecular weight ($M_n$) of the resin is at least about 12 and is less than about 30; and
      a 10% environmental stress cracking resistance of at least about 75 hours.

2. The single piece beverage bottle cap of claim 1, which is formed by subjecting the polymer resin to one or more of compression molding, injection molding, and roto-molding.

3. The single piece beverage bottle cap of claim 1, wherein the first polyethylene polymer has a low load melt index ($MI_2$) from about 0.3 dg/min to about 3.0 dg/min.

4. The single piece beverage bottle cap of claim 1, wherein the first polyethylene polymer has a low load melt index ($MI_2$) from about 0.4 dg/min to about 1.8 dg/min.

5. The single piece beverage bottle cap of claim 1, wherein the first polyethylene polymer has a $M_w/M_n$ ratio of at least about 14.

6. The single piece beverage bottle cap of claim 1, wherein the first polyethylene polymer has a $M_w/M_n$ ratio of at least about 16.

7. The single piece beverage bottle cap of claim 1, wherein the first polyethylene polymer has a bimodal molecular weight distribution, was synthesized using a Ziegler-Natta catalyzed, tandem, stirred slurry reactor system, or both.

8. The single piece beverage bottle cap of claim 1, wherein the first polyethylene polymer has a density from about 0.941 g/cm$^3$ to about 0.965 g/cm$^3$.

9. The single piece beverage bottle cap of claim 1, wherein the first polyethylene polymer has a density from about 0.950 g/cm$^3$ to about 0.958 g/cm$^3$.

10. The single piece beverage bottle cap of claim 1, wherein the first polyethylene polymer has a density no more than about 0.958 g/cm$^3$.

11. The single piece beverage bottle cap of claim 1, wherein the first polyethylene polymer has an environmental stress cracking resistance (bent strip, 100% Igepal®) of at least about 250 hours and an environmental stress cracking resistance (bent strip, 10% Igepal®) of at least about 100 hours.

12. The single piece beverage bottle cap of claim 1, wherein the polyethylene resin has a low load melt index (MI$_2$) from about 0.3 dg/min to about 3.0 dg/min.

13. The single piece beverage bottle cap of claim 1, wherein the polyethylene resin has a low load melt index (MI$_2$) from about 0.4 dg/min to about 1.8 dg/min.

14. The single piece beverage bottle cap of claim 1, wherein the polyethylene resin has a $M_w/M_n$ ratio of at least about 14.

15. The single piece beverage bottle cap of claim 1, wherein the polyethylene resin has a $M_w/M_n$ ratio of at least about 16.

16. The single piece beverage bottle cap of claim 1, wherein the polyethylene resin has a bimodal molecular weight distribution, was synthesized using a Ziegler-Natta catalyzed, tandem, stirred slurry reactor system, or both.

17. The single piece beverage bottle cap of claim 1, wherein the polyethylene resin has a density from about 0.950 g/cm$^3$ to about 0.958 g/cm$^3$.

18. The single piece beverage bottle cap of claim 1, wherein the polyethylene resin has a density no more than about 0.958 g/cm$^3$.

19. The single piece beverage bottle cap of claim 1, wherein the polyethylene resin has an environmental stress cracking resistance (bent strip, 100% Igepal®) of at least about 300 hours and an environmental stress cracking resistance (bent strip, 10% Igepal®) of at least about 125 hours.

* * * * *